United States Patent
Van Gestel et al.

(10) Patent No.: US 10,434,476 B2
(45) Date of Patent: Oct. 8, 2019

(54) CARBON-CONTAINING MEMBRANE FOR WATER AND GAS SEPARATION

(71) Applicant: Forschungszentrum Juelich GmbH, Juelich (DE)

(72) Inventors: Tim Van Gestel, Balen (BE); Oliver Guillon, Juelich (DE)

(73) Assignee: Forschungszentrum Juelich GmbH (DE)

( * ) Notice: Subject to any disclaimer, the term of this patent is extended or adjusted under 35 U.S.C. 154(b) by 186 days.

(21) Appl. No.: 15/568,511

(22) PCT Filed: Apr. 1, 2016

(86) PCT No.: PCT/DE2016/000141
§ 371 (c)(1),
(2) Date: Oct. 23, 2017

(87) PCT Pub. No.: WO2016/177355
PCT Pub. Date: Nov. 10, 2016

(65) Prior Publication Data
US 2018/0141006 A1 May 24, 2018

(30) Foreign Application Priority Data
May 7, 2015 (DE) .................. 10 2015 005 732

(51) Int. Cl.
*B01D 53/22* (2006.01)
*B01D 67/00* (2006.01)
(Continued)

(52) U.S. Cl.
CPC ..... *B01D 67/0041* (2013.01); *B01D 67/0044* (2013.01); *B01D 69/02* (2013.01);
(Continued)

(58) Field of Classification Search
CPC B01D 69/10; B01D 2325/24; B01D 2325/26; B01D 2325/02; B01D 71/028;
(Continued)

(56) References Cited

U.S. PATENT DOCUMENTS 9,844,758 B2 * 12/2017 Nair ............. B01D 53/228
2010/0307974 A1 * 12/2010 Pettinger ............. A61L 9/01
210/650
(Continued)

FOREIGN PATENT DOCUMENTS

| WO | 2009117978 A1 | 10/2009 |
| WO | 2014004514 A1 | 1/2014 |
| WO | 2014164621 A1 | 10/2014 |

OTHER PUBLICATIONS

Huang Hua et al: "Facile one-step forming of NiO and yttrium-stabilized zirconia composite anodes with straight open pores for planar solid oxide fuel cell using phase-inversion tape casting method", Journal of Power Sources, Elsevier SA, CH, vol. 274, Oct. 31, 2014 (Oct. 31, 2014), pp. 1114-1117, XP029104450, ISSN: 0378-7753, DOI: 10.1016/J.JPOWSOUR.2014.10.190.
(Continued)

*Primary Examiner* — Anthony R Shumate
(74) *Attorney, Agent, or Firm* — Jordan and Koda, PLLC (57) ABSTRACT

The invention relates to a multilayer metallic or ceramic membrane device, comprising a macroporous carrier layer including pores having a pore diameter of more than 50 nm, and at least one mesoporous intermediate layer disposed thereon, including pores having a pore diameter of 2 nm to 50 nm. The membrane device according to the invention furthermore comprises at least one microporous cover layer disposed on the mesoporous intermediate layer, including pores having an average pore diameter of 0.3 nm to 1.5 nm, comprising graphite oxide or few-layer graphene oxide or graphite or few-layer graphene. In an advantageous embodi-
(Continued)

ment, the cover layer comprises between 5 and 1000 layers of graphene oxide. In an advantageous embodiment, the cover layer can comprise between 5 and 1000 layers of partially reduced graphene oxide or graphene as a result of the at least partial reduction of the graphene oxide. The multilayer, chemically and mechanically stable and temperature-resistant membrane device according to the invention, comprising the functional cover layer thereof including microporous graphene oxide or graphene, is advantageously suitable for use in water separation or purification, or for gas separation.

22 Claims, 8 Drawing Sheets (51) Int. Cl.
    B01D 71/02    (2006.01)
    B01D 69/02    (2006.01)
    B01D 69/10    (2006.01)
    B01D 69/12    (2006.01)
(52) U.S. Cl.
    CPC ............ B01D 69/10 (2013.01); B01D 69/12 (2013.01); B01D 71/021 (2013.01); B01D 71/024 (2013.01); B01D 71/028 (2013.01); B01D 71/025 (2013.01); B01D 2323/08 (2013.01); B01D 2325/02 (2013.01); B01D 2325/22 (2013.01); B01D 2325/24 (2013.01); B01D 2325/26 (2013.01); B01D 2325/30 (2013.01)
(58) Field of Classification Search
    CPC ............ B01D 2325/22; B01D 2325/30; B01D 69/02; B01D 67/0041; B01D 2323/08; B01D 71/025; B01D 67/0044; B01D 71/021; B01D 71/024; B01D 69/12
    See application file for complete search history.

(56) References Cited

U.S. PATENT DOCUMENTS

| | | | |
|---|---|---|---|
| 2011/0148248 A1 | 6/2011 | Landa | |
| 2013/0284665 A1* | 10/2013 | Lee | B01D 67/0079 210/489 |
| 2013/0305927 A1 | 11/2013 | Choi et al. | |
| 2014/0069277 A1* | 3/2014 | Choi | B01D 53/228 96/13 |
| 2014/0138316 A1* | 5/2014 | Basheer | C02F 1/4606 210/650 |
| 2014/0230653 A1* | 8/2014 | Yu | B01D 67/0046 96/11 |
| 2015/0141711 A1* | 5/2015 | Chu | C07C 29/76 568/918 |
| 2015/0174532 A1* | 6/2015 | Wilson | B01D 59/14 210/640 |
| 2015/0231577 A1* | 8/2015 | Nair | B01D 71/024 210/640 |
| 2016/0115647 A1* | 4/2016 | Basheer | D06M 16/00 427/121 |
| 2016/0280563 A1* | 9/2016 | Raveendran-Nair | B01D 71/021 |
| 2016/0297693 A1* | 10/2016 | Raveendran-Nair | B01D 61/002 |
| 2016/0317975 A1* | 11/2016 | Xiao | B29D 99/005 |
| 2019/0148085 A1* | 5/2019 | Kim | H01G 11/52 |

OTHER PUBLICATIONS

Sigma Aldrich, Catalogue Nr. 237957.
Sigma Aldrich Catalogue Nr. 777676.
Sigma-Aldrich, Catalogue Nr. 333972.
Merck, SeccoSolv®, Catalogue Nr. 100994.
Whatman FP 30/5.0 CN (GE Life Sciences).

* cited by examiner

CARBON-CONTAINING MEMBRANE FOR WATER AND GAS SEPARATION

The invention relates to a carbon-containing membrane, and in particular to a membrane comprising graphite oxide or graphite, which can be used, in particular, for water and gas separation.

BACKGROUND OF THE INVENTION

Separating membranes can, in principle, be present in the form of porous or non-porous layers. Among separating membranes, a distinction is made between homogeneous and asymmetric membranes. Homogeneous membranes are generally very thin to have the highest permeability per unit surface area possible. However, the mechanical stability of these thin membranes is frequently not sufficient. In asymmetric membranes, in contrast, a very thin separating layer is disposed on a mechanically stable porous substructure having high permeability.

Separating processes can be classified according to the phases involved (solid, liquid, gas) and are widely used in industrial applications. Membrane processes are also increasingly considered an alternative to conventional separation methods, such as distillation, crystallization, cryogenic separation, adsorption or extraction. However, use is disadvantageously limited by a lack of suitable membranes that not only have the necessary separation properties, but can also withstand harsh operating conditions (high temperatures, high pressures, water vapor, corrosive gases, corrosive liquids).

Membranes used commercially in separation processes to date generally comprise a polymer material, which has certain disadvantages, in terms of lacking mechanical, thermal and chemical stability, and can therefore only be used on a limited scale.

On the other hand, ceramic microporous membranes are already known, which comprise a functional layer made of zeolite, silica ($SiO_2$) or carbon, and so-called hybrid $SiO_2$ membranes which, in addition to $SiO_2$, also comprise carbon atoms. These membranes are proposed as an alternative to polymer membranes. They can be used in a broader range of applications and moreover have a considerably longer service life. They are frequently resistant to the majority of organic solvents and are generally temperature-stable up to approximately 300° C. in the case of hybrid membranes, and possibly up to even higher temperatures.

In particular, zeolite membranes are suitable, both on a test scale and on a large scale, for use with separation processes of solvents, such as in the liquid phase (pervaporation (PV)) or in the vapor phase (vapor permeation (VP)). Some of these membranes have an extremely narrow pore size distribution around approximately 0.5 nm and are in particular suitable for separating water from all kinds of organic solvents.

Microporous amorphous $SiO_2$ membranes have been known for more than 20 years. These membranes generally comprise a microporous $SiO_2$ membrane layer having a pore size of greater than 0.5 nm, which is applied onto a mesoporous carrier comprising γ-$Al_2O_3$ by way of a sol gel process. Since their appearance, interest in these membranes has grown steadily, as they have sufficiently good separation properties for both water separation and gas separation.

One of the characteristic properties of such microporous ceramic gas separating membranes is thermally activated gas transport. It was found that, for high-quality membranes, the gas flow (flux) J through the microporous material increases as a function of the temperature according to the Arrhenius equation:

$$J = J_0 \exp(-E_{act}/RT)$$

where J=flux(mol $m^{-2}$ $s^{-1}$), $J_0$=temperature-independent coefficient (mol $m^{-2}$ $s^{-1}$), R=gas constant (J $mol^{-1}$ $K^{-1}$), T=temperature (K), and $E_{act}$=activation energy (kJ $mol^{-1}$).

Ascertaining activation energies for the gas transport in zeolite separating membranes and amorphous $SiO_2$ separating membranes has shown that a relationship exists between the activation energy for the diffusion and the pore size and quality of the separating membrane. In general, the activation energy is greater with small pores than with large pores. Furthermore, a given separation membrane, the activation energy rises for with the quality thereof. A membrane of high quality is considered to be a membrane having no cracks or other defects (such as large pores) and having a narrow pore size distribution. For high-quality microporous ceramic membranes, the $E_{act}$ value for the diffusing gases, such as He or $H_2$, is generally higher than 10 kJ $mol^{-1}$.

Additionally, it was found that separating membranes having a high activation energy for diffusion have molecular sieve properties for the smallest gas molecules, such as He or $H_2$, which is to say the permeation increases with decreasing size of the gas molecules, or $N_2 < CO_2 < H_2 < He$. As a result, such separating membranes generally have a high gas selectivity for the smallest gas molecules (He, $H_2$).

However, both the zeolite membranes and the amorphous $SiO_2$-based membranes, which were contemplated as possible alternatives to polymer membranes, have the disadvantage that they are only resistant to acid and alkaline solutions to a limited degree. Moreover, it has been found that a number of zeolite membranes, and in particular traditional amorphous $SiO_2$ membranes, do not have long-term stability with respect to hydrothermal conditions.

In practice, the use of amorphous $SiO_2$ membranes is generally limited to dry applications, due to the particular sensitivity of the material to water. So as to improve material stability, a variety of modified $SiO_2$ membranes were produced. These membranes were likewise applied by way of a sol gel process onto a mesoporous carrier comprising γ-$Al_2O_3$.

In addition to amorphous $SiO_2$, these also comprised oxides, for example, such as $ZrO_2$ or $TiO_2$, or metals, such as Ni or Co, as a second component. However, this also did not yield suitable membranes having sufficient stability and a suitable pore size distribution for water or gas separation.

Hybrid carbon-containing $SiO_2$ membranes are now also known, which have improved resistance to liquid water and water vapor at temperatures up to 150° C. (Hybsi®). Due to the partial $SiO_2$ nature of these membranes, however, the scope of applications in water is likewise limited in practice. Moreover, thermal stability is limited to a maximum of 300° C., which restricts application options in gas separation. Such membranes are generally also not able to separate the smallest gas molecules (He, $H_2$) from other gas molecules (such as $CO_2$, $N_2$, $CH_4$) by way of molecular sieve processes since the pore size typically exceeds 0.5 nm.

Recently, graphene and graphene oxide have commanded enormous attention as potential membrane materials. Graphene and graphene oxide can be considered to be membranes that, strictly speaking, have a design that is only one atom layer thick. As a result, they constitute the absolutely thinnest artificially produced membranes.

Graphene is understood to mean a 2-dimensional carbon monolayer made of $sp^2$ hybridized carbon, in which the carbon atoms are disposed in a honeycomb structure. Graphene oxide represents an accordingly functionalized form of graphene, in which oxygen-containing groups, such as hydroxyl, epoxy, carbonyl, carboxyl, lactone and quinone, are bound both on the edges and in the plane. Graphene oxide thus comprises both $sp^2$ and $sp^3$ hybridized carbon.

It was suspected that graphene and graphene oxide layers would not be permeable for both liquids and for gases, including helium, the smallest gas molecule. So as to arrive at a permeable membrane, it was therefore proposed to provide such a membrane with small apertures, which can be created by etching processes, for example.

As early as 2013, Lockheed Martin introduced a perforated membrane, Perforene™, which is only one atom layer thick, made of a graphene layer and has holes having a diameter of approximately 1 nm. The following advantages are cited for this membrane:

a) it is resistant to high pH values and corrosive cleaning agents;
b) it can be used at high temperatures;
c) it exhibits good separating action;
d) it has improved water flow and is therefore energy-saving; and
e) it is electrically conductive and hydrophobic, resulting in a reduced tendency toward clogging in real applications.

However, to date, no methods are known for exactly controlling pore formation. Other technological challenges include, for example, producing such membranes on a large scale and the robustness thereof.

Alternatively, it was also already proposed to stack several graphene or graphene oxide layers so as to arrive at what is known as few-layer graphene or graphene oxide. If the layers are stacked compactly and densely, lateral nanochannels form, in which small molecules, such as He, $H_2$ or water, are able to pass, but which are impervious to larger molecules. Normally, and within the scope of the present invention, aggregates composed of fewer than 10 graphene or graphene oxide layers are referred to as few-layer graphene or graphene oxide. Those comprising more layers could generally be referred to as graphite oxide layers or graphite layers.

Furthermore, membranes have been described over the last 2 to 3 years which comprise stacked graphene oxide layers and are frequently referred to as graphene oxide membranes, and which underscore the general suitability thereof as separating membranes. Such membranes have a structure comparable to graphite, although the distance between the individual layers is larger, for example due to the bound functional oxygen-containing groups and intercalation of water molecules. In contrast with graphene layers, the exact structure and composition of the individual graphene oxide layers is not clearly defined. In contrast with graphene, graphene oxide comprises $sp^2$ and $sp^3$ carbon atoms, and for this reason the layers have a non-planar, irregularly undulated structure.

Graphene oxide can be obtained from graphite oxide, for example. Graphite oxide is understood to mean a non-stoichiometric compound made of carbon, oxygen and hydrogen, the empirical formula of which varies greatly depending on the production conditions. Graphite oxide, in turn, can be obtained from graphite using strong oxidizing agents, for example, by way of the known synthesis methods of Brodie, Hummer or Staudenmaier. During the production of graphite oxide, the graphene layers in the graphite are oxygenated, yielding a hydrophilic material. A particular property of the graphite oxide is that it can be colloidally dispersed in water, resulting in the formation of colloidal dispersions. The detachment of individual layers of the graphite oxide, for example by way of ultrasonic energy, results in monolayer graphene oxide.

The typical production route for the aforementioned kind of membranes provides for the application of individual graphene oxide layers onto a carrier material by way of vacuum filtration methods. During coating, a colloidal dispersion composed of monolayer graphene oxide and water is used.

Even though the monolayer or multilayer graphene oxide membranes already produced on a test scale exhibit very advantageous properties, they are presently not yet of sufficient interest for commercial fields of applications since they still involve a number of drawbacks. These include:

a) The membranes have not yet been provided with a suitable carrier that is able to withstand the harsh operating conditions in industrial applications (high temperatures, hydrothermal conditions, corrosive gases, corrosive liquids).
b) The membranes are generally not fixedly joined to the carrier.
c) Due to the lack of a robust carrier, the membranes are not pressure-stable.
d) The membranes are presently produced by way of methods that cannot be freely translated to a large scale.
e) The membranes presently do not yet have the size and dimensions needed in industrial plants.
f) The membranes do not have a molecular sieve effect, such as the known amorphous $SiO_2$-based microporous membranes.

In the microporous ceramic membranes known from the literature (such as amorphous $SiO_2$, hybrid carbon-containing $SiO_2$, carbon), the mesoporous layer generally comprises γ-aluminum oxide (γ-$Al_2O_3$), titanium dioxide ($TiO_2$), zirconium dioxide ($ZrO_2$), silicon oxide ($SiO_2$) or mixtures of the aforementioned materials, which can be produced by way of a sol gel coating process, for example. These layers, however, generally exhibit only limited chemical (γ-$Al_2O_3$, $SiO_2$), thermal ($TiO_2$, $ZrO_2$) or hydrothermal (all) stability.

Furthermore, previously known graphene oxide membranes are produced at room temperature or treated at only slightly elevated temperatures up to 220° C. Due to the previously used carrier materials and/or the properties of the graphene oxide membranes, such as the layer thickness, it was not heretofore possible to use higher temperatures (T>220° C.) for such membranes.

Theoretically, a membrane composed of only few graphene layers appears to be particularly well-suited for the separation of smaller molecules (He, $H_2$) from a gas mixture (such as with $CO_2$, $N_2$, CO or $CH_4$), since the distance between graphene layers is in the order of magnitude of 0.335 nm. It is assumed that the distance between graphene oxide monolayers in few-layer graphene oxide and graphite oxide is greater than that between graphene layers. The literature reports distances between graphene oxide monolayers of 0.6 nm to more than 1 nm, as a function of the presence of water (liquid, vapor).

SUMMARY OF THE INVENTION

It is the object of the invention to provide a membrane comprising graphite oxide or graphite for industrial use, which overcomes the difficulties cited in the prior art and, in particular, can also be used at higher temperatures and pressures and under hydrothermal conditions. It is a further object of the invention to create a production method for providing such a membrane.

The objects of the invention are achieved by a membrane according to the main claim and by a method for producing such a membrane according to the additional independent claim. Advantageous embodiments of the membrane or of the production method can be found in the dependent claims.

The invention relates to a multilayer ceramic membrane device having a pore structure that, depending on the field of application, is able to allow water or smaller gas molecules, such as He or $H_2$, to pass and thereby separate these from a gaseous or liquid mixture. For this purpose, the membrane device according to the invention comprises a macroporous carrier, at least one mesoporous intermediate layer disposed thereon, and at least one microporous cover layer comprising graphite oxide or graphite disposed on the intermediate layer.

According to the invention, a thermally, chemically and mechanically stable carrier system (macroporous carrier and mesoporous layer) is advantageously joined to a functional cover layer, comprising graphite oxide or graphite, to form a multi-purpose membrane device.

Within the scope of the present invention, a cover layer, comprising graphite oxide or graphite, is understood to mean a layering of superimposed graphene and/or graphene oxide monolayers. The number of monolayers varies in the range between approximately 5 and 1000. Assuming that 1000 monolayers of graphene have a layer thickness of approximately 600 nm, and 1000 monolayers of graphene oxide have a layer thickness of approximately 1 to 2 μm, the layer thickness of the cover layer is thus typically less than 2 μm, and advantageously even less than 300 nm.

For example, a porous $\alpha$-$Al_2O_3$ carrier, which can be produced by way of conventional ceramic powder technology methods, can be used as the macroporous carrier layer of the multilayer membrane device according to the invention. Furthermore, however, it is also possible to use the previously known carrier materials, such as titanium dioxide ($TiO_2$), zirconium dioxide ($ZrO_2$), yttria-stabilized zirconia (YSZ), silicon oxide ($SiO_2$), cerium oxide ($CeO_2$), magnesium oxide (MgO), yttrium oxide ($Y_2O_3$), gadolinium oxide ($Gd_2O_3$), silicon carbide (SiC), carbon or metallic components as the carrier. Further suitable ceramic materials for the carrier structure are, for example, mullite, cordierite, zeolite, barium titanium oxide ($BaTiO_3$), silicon nitride ($Si_3N_4$), silicon oxycarbide (SiOC), silicon carbonitride (SiCN), aluminum nitride (AlN) or mixtures of the aforementioned materials.

The macroporous layer can have a monolayer or multilayer graded design. If several macroporous layers are provided, the layer disposed further away from the carrier generally has a smaller average pore size than the intermediate layer disposed more closely to the carrier. The aforementioned carrier materials can be used as materials for the macroporous layers. The macroporous layers can be applied onto the carrier by way of conventional methods, such as suspension coating methods or doctoring.

However, the aforementioned layers can also only be designed as one graded carrier layer.

The carrier itself can be present in all known geometries, which is to say as a flat layer, as a cylindrical tube, as a hollow fiber or as a capillary. If the carrier has the shape of a cylindrical tube, of a hollow fiber or of a capillary, the remaining layers and the cover layer can be disposed both on the inner side and on the outer side. Furthermore, the carrier proper may also be designed as a multi-channel element, for example as a multi-channel plate or a multi-channel tube, or in a honeycomb structure.

At least one mesoporous intermediate layer is disposed between the macroporous carrier layer and the functional cover layer. Viewed from the direction of the carrier, this not only has a smaller average pore size, but also lower surface roughness. The average pore size of the mesoporous intermediate layer disposed on the carrier layer generally ranges between 2 nm and 50 nm.

If several mesoporous intermediate layers are provided, the mesoporous intermediate layer disposed further away from the carrier generally has a smaller average pore size and lower surface roughness than the intermediate layer disposed more closely to the carrier. Advantageously, if several mesoporous intermediate layers are present, at least one has an average pore diameter of <5 nm, and advantageously it is the one provided for the contact with the cover layer.

However, the aforementioned mesoporous intermediate layers can alternatively be designed as only one graded layer.

In addition to $\gamma$-$Al_2O_3$, suitable materials for a mesoporous layer include titanium dioxide ($TiO_2$), zirconium dioxide ($ZrO_2$), yttria-stabilized zirconia (YSZ), silicon oxide ($SiO_2$), cerium oxide ($CeO_2$), magnesium oxide (MgO), yttrium oxide ($Y_2O_3$), gadolinium oxide ($Gd_2O_3$), zinc oxide (ZnO), tin oxide ($SnO_2$), mullite, cordierite, zeolite, metal-organic framework (MOF) materials, clay, barium titanium oxide ($BaTiO_3$), carbon, silicon carbide (SiC), silicon nitride ($Si_3N_4$), silicon oxycarbide (SiOC), silicon carbonitride (SiCN), aluminum nitride (AlN) or mixtures of the aforementioned materials.

The mesoporous layer can likewise be applied onto the macroporous layer by way of conventional methods, such as coating with a colloidal suspension, a sol gel coating process, or hydrothermal synthesis. For this purpose, particles having an average particle diameter of 5 to 200 nm are advantageously used together with typical binding agents, such as polyvinyl alcohol, polyethylene glycol or cellulose compounds, dissolved in water. Due to the necessary small particle size of the starting material, metallic materials are generally not suitable for producing mesoporous layers. After the coating process, drying takes place at temperatures up to 100° C.

After the drying process, a thermal treatment step takes place at temperatures above 300° C. so as to calcine the layer.

In an advantageous embodiment of the invention, a mesoporous layer comprising zirconia stabilized with 8 mol % yttria (8YSZ) is applied onto a macroporous carrier by way of the dip coating process. It has been shown that such a layer withstands temperatures up to 1000° C. without damage. Temperatures in the range of 500° C. to 900° C. are needed to advantageously cause a full reduction of the graphene oxide in a later method step by conducting a high temperature treatment.

In particular, the membrane device comprises at least one macroporous carrier including pores in the range of >50 nm and at least one mesoporous intermediate layer including pores in the range of 2 nm to <50 nm, at a layer thickness of between 0.1 and 10 μm.

The microporous cover layer of the multilayer ceramic membrane device according to the invention generally includes pores in the range of 0.3 to 1.5 nm. The thickness of this layer is generally less than 2 μm, preferably between 5 nm and 1 μm, and advantageously between 5 nm and 300 nm. The pore size of this cover layer is substantially determined by the distance between the graphene or graphene oxide layers of the cover layer.

To apply the microporous cover layer onto the mesoporous intermediate layer, this is coated with a colloidal dispersion composed of monolayer graphene oxide particles and water. Dip coating, spin coating, spraying, flooding, drop coating, roller coating, ink jet printing or vacuum filtration are possible application methods.

In addition to aqueous dispersions, it is also possible to use dispersions composed of graphene oxide particles and polar organic solvents, such as alcohols, ethers, cyclic ethers (THF, DMF) or N-methyl-2-pyrrolidone (NMP).

After the graphene oxide particles have been applied, drying is carried out at temperatures up to 200° C. The drying process is followed by a thermal treatment, at temperatures up to 450° C., so as to cause the necessary binding of the cover layer to the mesoporous layer and improve the structural stability of the cover layer.

The cover layer generally has a tendency to tear during the drying process and the thermal treatment. This effect limits the layer thickness. If a particularly thick cover layer is to be applied, it is an obvious choice to do so in several method steps. The second step can take place as soon as the layer applied in the first step has dried and, if necessary, baked-out. Typically, layer thicknesses up to 100 nm each can be achieved using one application step.

In an advantageous embodiment of the invention, a colloidal dispersion composed of monolayer graphene oxide particles and water is applied onto the mesoporous layer by way of the dip coating method. It has been shown that the dip coating method yields a cover layer comprising very homogeneous and compact graphene oxide layers. Moreover, the dip coating method is a coating method that allows membranes to be produced in all arbitrary sizes and dimensions and that can be translated into a large scale. A drying step at a temperature of approximately 25° C. follows. Thereafter, the cover layer is baked out under air, preferably at a temperature of more than 200° C., such as at 300° C. or up to a maximum of 450° C. This thermal method step yields a robust and thermally stable cover layer, which additionally has a very good bond with the mesoporous intermediate layer disposed underneath.

So as to prevent the risk of the cover layer breaking, it is proposed to coat the mesoporous intermediate layer with only a very thin layer comprising graphite oxide or optionally few-layer graphene oxide. For this purpose, in particular a highly diluted colloidal dispersion comprising monolayer graphene oxide particles can be used. A highly diluted colloidal dispersion shall be understood to mean a dispersion having a solids content of between 20 and 2000 mg/liter, and preferably between 200 and 400 mg/liter.

The applied layer preferably has a layer thickness of less than 2 µm, preferably even a layer thickness of in the range between only 5 nm and 1 µm, and particularly advantageously in the range between 5 nm and 300 nm.

The membrane device produced according to the above-mentioned method typically comprises a cover layer that predominantly comprises graphite oxide or few-layer graphene oxide.

The individual graphene oxide layers of the cover layer generally have a distance between layers of 0.6 nm to 1.3 nm, depending on moisture. Graphene oxide itself is hydrophilic. Such a functional layer is therefore suitable, in particular, for separating tasks in which water is to be separated from other larger molecules in the liquid or gas phase.

The functional graphite oxide layer or few-layer graphene oxide layer is also suitable for traditional gas separation. The advantage of such a layer is that the distance between the individual layers can advantageously be set by adapting the moisture level. It has been shown that the membrane is selective for He and $H_2$ under dry conditions. Larger molecules are retained. Under moist conditions, water molecules are intercalated between the graphene oxide layers. This enables the membrane to selectively separate water-soluble gas molecules from less soluble molecules. Water-soluble $CO_2$ may thus penetrate the membrane, for example, while less soluble molecules, such as $N_2$, are retained to a larger degree.

Depending on the application, however, an embodiment comprising a cover layer at least partially or fully made of graphite or few-layer graphene is also desirable, instead of a cover layer comprising graphite oxide or few-layer graphene oxide.

The at least partial reduction of the cover layer and the formation of a graphite-like structure appear to be of great interest. Graphite is made of $sp^2$ hybridized carbon atoms, which are linked by very stable C—C bonds. The $sp^2$ hybridization, and the consequently present delocalized π-electrons, also explain the electrical conductivity of the graphite. This also imparts a substantially chemically resistant structure to graphite, and compared to graphite oxide, graphite is much more resistant to thermal decomposition. The presence of $sp^3$ hybridized carbon and oxygen-containing functional groups in graphene oxide layers generally causes these to become thermally and chemically unstable. Thermal decomposition (oxidation with air) and etching (such as by way of water vapor) of the material usually start in these locations.

For example, it was possible to demonstrate that, after hydrothermal treatment with water vapor at 200° C. over a period of 10 hours, graphene oxide particles already broke down into smaller fragments. It is therefore advisable to convert the cover layer, during production, into a graphite-like material comprising predominantly $sp^2$ hybridized carbon, when applications in gas separation at higher temperatures and the use of water vapor is intended.

Independently of the improvement in stability, it was also found that thermal reduction of the graphite-oxidic cover layer at high temperatures results in considerable improvement in the gas permeation of the permeating gas. Such thermal reduction yields a material that advantageously only comprises negligible fractions of functional groups. Fewer functional groups, however, also mean less steric hindrance when the permeating gas passes through the micro-channels between the individual layers, and consequently increased gas permeability.

For these instances, the invention provides that the previously created graphite oxide-comprising or few-layer graphene oxide-comprising cover layer, together with the carrier layer and the mesoporous intermediate layers, is subjected to a reduction step, in which the graphene oxide of the cover layer is at least partially reduced to graphene.

Reduction of the graphene oxide may take place both chemically and thermally. During the chemical reduction, a reducing agent, such as hydrazine, $NaBH_4$, HI or ascorbic acid, is used at temperatures up to 200° C. The chemical reduction of graphene oxide may take place both on graphene oxide particles in the colloidal dispersion and on a graphite oxide layer applied onto the carrier.

Higher temperatures of between 500 and 900° C. are needed for full thermal reduction. Graphite oxide, however, is not very thermally stable and generally converts into CO, $CO_2$, water and graphite starting at 200° C. Although, in practice, the temperature range in which this reaction takes place is relatively wide, it is clear that treatment at higher temperatures results in the at least partial decomposition of the starting material.

It is therefore proposed to carry out the elimination of oxygen-containing groups of the cover layer under vacuum or under a reducing atmosphere (such as a mixture of $H_2$ and Ar). Theoretically, heating graphene oxide under an inert atmosphere results in conversion to pure graphene and in an elimination of water and oxygen. However, it has yet to be clarified what reaction mechanisms take place in this process. In practice, however, the graphene obtained is not perfect, but rather partially reduced graphene oxide. Moreover, high temperatures in the range between 500 and 900° C. are necessary to eliminate all oxygen-containing functional groups, so as to yield completely reduced graphene.

In graphene oxide, carboxyl, carbonyl and lactone groups can be reduced at approximately 450° C. Quinone groups generally decompose between 500 and 900° C. Above 900° C., hydroxyl groups also begin to decompose. Carboxyl, carbonyl, lactone and quinone groups appear to be responsible for reactions with water vapor. The aforementioned groups are decomposed in graphite oxide that was thermally reduced under an $H_2$/Ar atmosphere, and they are expelled, by way of baking out, at temperatures between 500 and 800° C., whereby a considerably more inert material can be obtained.

Alternatively, the conversion of graphite oxide into graphite can also be carried out in a carbon-containing atmosphere (such as acetylene), wherein an improved self-regeneration process can take place. Other possible methods are, for example, treatment in the presence of hydrogen plasma, a strong light pulse (such as xenon) or microwaves.

The selection of which method to employ to achieve the reduction depends, among other things, on the material selection for the carrier layer and intermediate layers used. If these do not withstand the higher temperatures necessary for the reduction, for example due to phase instabilities or other thermal reactions, chemical reduction may be resorted to.

In an advantageous embodiment of the multilayer membrane device according to the invention, the mesoporous intermediate layer comprises zirconium dioxide, and in particular yttria-stabilized zirconia (YSZ), and advantageously what is known as 8YSZ, which is particularly thermally stable and allows thermal reduction at temperatures up to 1000° C.

Within the scope of the invention, it was found that the use of a thermally stable ceramic or metallic carrier, or carrier system, advantageously allows the cover layer, comprising graphene oxide or graphene, as the actual functional layer of the ceramic membrane device to be thermally treated. A thermal treatment step in the production of a microporous membrane is of crucial importance. Only in such a method step is the necessary bond established between the microporous layer and the layer beneath. If such a bond is not sufficiently present or not present at all, there is a risk that the membrane will detach during operation, and that the functionality of the membrane device can no longer be ensured.

Another advantage of a thermally resistant carrier or carrier system is that, in this way, the reduction of graphene oxide into graphene within the cover layer, which is necessary for some applications and can only be carried out at high temperatures, can take place directly, and advantageously together with the multilayer carrier system, comprising the carrier layer and one or more macroporous and mesoporous intermediate layers.

The reduction of graphene oxide can, in principle, be achieved both with chemical methods and with thermal methods. Due to the low thermal stability of the carrier materials and/or the properties of the graphene oxide membranes, the production methods known from the prior art previously had to resort to the less practical method of chemical reduction, while advantageously thermal reduction can be employed for the membrane device according to the invention.

The multilayer, and in particular ceramic, membrane device according to the invention is advantageously not only chemically resistant, but, depending on the carrier, generally also withstands high pressures and temperatures up to 1000° C. without damage.

The multilayer membrane device according to the invention can thus be used, in particular, for the industrial separation of water or gases, such as He or $H_2$.

For the multilayer membrane device according to the invention to withstand the typical temperature, corrosion and pressure conditions prevailing in industrial separation processes, the functional graphite oxide layer or graphite layer is disposed on a thermally stable, chemically stable and pressure-stable, porous, ceramic carrier layer. Thermal treatment of the two components results in the formation of a mechanically stable bond between the active membrane layer and the carrier layer. The multilayer (graded) separating membrane thus obtained is mechanically robust and stable at high temperatures and high pressures. It is resistant to most chemicals, and in particular to all kinds of organic liquids, and (not highly oxidizing) acids and lyes.

The multilayer membrane device according to the invention, comprising the functional microporous graphite oxide layer or graphite layer, is advantageously suitable for use in water separation or purification, or for gas separation. Methods in which the multilayer membrane device according to the invention can advantageously be used include pervaporation (PV), vapor permeation (VP), nanofiltration (NF) or gas separation, for example.

It has been found that, depending on the configuration including a cover layer comprising graphite oxide or graphite, the multilayer ceramic membrane device according to the invention advantageously is permeable by water, $H_2$ and He, and yet retains larger molecules and compounds in liquid or gaseous form.

It was found that the flux of He and $H_2$ of the membrane device according to the invention follows the known Arrhenius equation $J=J_0 \exp(-E_{act}/RT)$.

This behavior is typical of high-quality microporous membranes having very small pores (<0.5 nm) and a very narrow pore size distribution. It is likewise known that membranes having thermally activated gas transport generally have molecular sieve properties and large separation factors.

Comparable graphene oxide membranes from the prior art so far have not exhibited molecular sieve properties, which could possibly point to the presence of defects in these membranes or inhomogeneous coverage of the carrier material. The occurrence of activated transport and the molecular sieve properties of the membrane device according to the invention can thus serve as an indication that, due to the graded carrier system comprising at least one mesoporous intermediate layer as the basis for the cover layer, the quality and the homogeneity of the cover layer is considerably higher, in the membrane device according to the invention, than in the previously known graphene oxide membranes.

Moreover, it is advantageously possible, in the membrane device according to the invention, to adapt the distances between the individual graphene oxide layers or graphene layers of the cover layer, whereby the permeability properties of the membrane can be actively varied. In the case of graphite oxide layers in the cover layer, the distances between the individual graphene oxide layers may be set, for example, by adjusting the moisture of the involved gases. Another option for the distances between the layers can be to use cross-linking agents, which generally fix the distances between the individual layers. Cross-linking of the individual layers can take place by cross-linking individual reactive groups of the graphene oxide layers. If an inorganic cross-linking agent is used, cross-links between the layers are generally preserved during a thermal reduction of graphite oxide into graphite.

The cover layer of the membrane device according to the invention can advantageously be reversibly reduced and re-oxidized with the aid of thermal method steps. Proceeding from a graphite oxide layer, reduction generally results in a partially reduced graphite oxide layer, or even a graphite layer. Oxidation accordingly reverses these processes. In this way, it is possible to specifically set, not only the hydrophilic or hydrophobic properties of the membrane, but also the gas permeability.

For example, a cover layer comprising graphite oxide, which was treated at 300° C. under air, initially has hydrophilic properties, while it shows hydrophobic properties after aging at 750° C. in a mixture of 3% $H_2$ and 97% Ar. At the same time, it was possible to increase the He and $H_2$ permeation by a factor of 2 to 3.

After further treatment at 300° C. under air, the cover layer again showed the initial hydrophilic properties.

BRIEF DESCRIPTION OF THE DRAWINGS

To further illustrate the invention, this will be described in greater detail based on several figures, diagrams and exemplary embodiments, without thereby limiting the invention. In the drawings.

DESCRIPTION OF THE PREFERRED EMBODIMENTS

Figure 1:
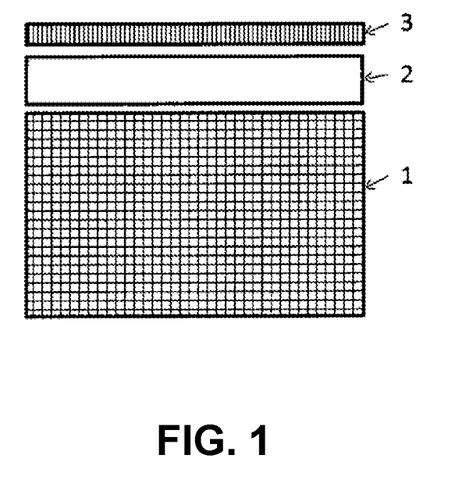
FIG. 1 shows a schematic illustration of the composition of the multilayer graphite or graphite oxide membrane device according to the invention.

FIG. 1 shows a schematic cross-section of an embodiment of the invention. Building upon one another, the membrane comprises a metallic or ceramic porous carrier 1, a ceramic mesoporous intermediate layer 2 disposed on this macroporous carrier, and a microporous cover layer 3, which is disposed on this mesoporous intermediate layer and comprises graphite oxide or few-layer graphene oxide or graphite or few-layer graphene. The macroporous layer 1 can have a monolayer or multilayer graded design. The mesoporous intermediate layer 2 can also have a monolayer or multilayer graded design.

Figure 2A:
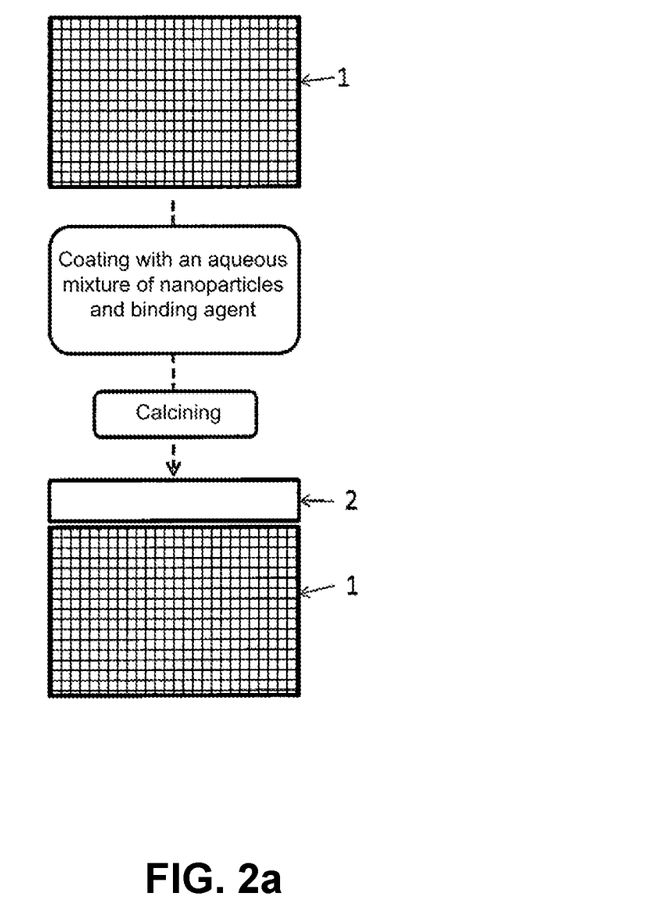
FIG. 2 shows a schematic illustration of the alternating method steps during the production of the membrane device according to the invention.
Figure 2B:
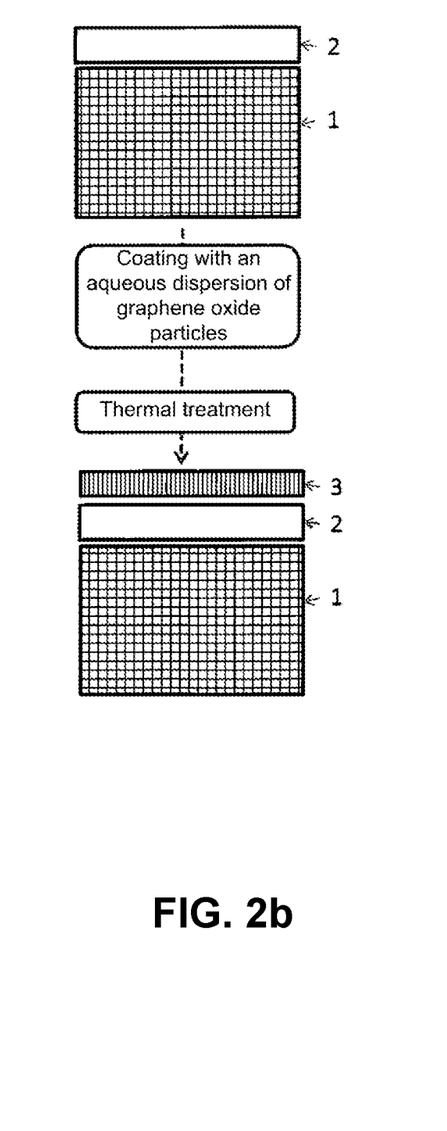

FIG. 2 schematically shows the production processes for the membrane device according to the invention. On the left side (FIG. 2*a*), first, the application of the mesoporous intermediate layer 2 onto the macroporous carrier 1 is shown, while on the right side (FIG. 2*b*), the application of the functional cover layer 3 onto the mesoporous intermediate layer 2, in a subsequent method step, is shown.

Figure 3:
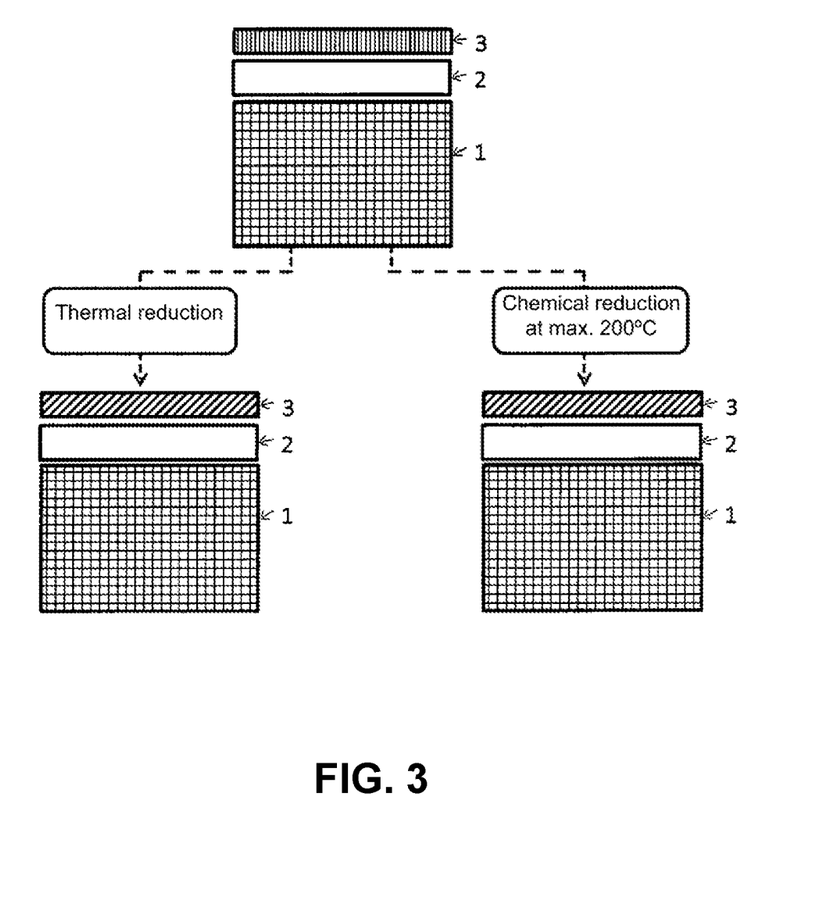
FIG. 3 shows a schematic illustration of two alternative method steps for at least partial reduction of the graphite oxide into graphite.

FIG. 3 shows the alternative methods for reducing the graphene oxide into graphene. Thermal reduction (left side), for example, under vacuum, inert gas or under a reducing atmosphere, (such as Ar/$H_2$ mixture), necessitates higher temperatures and can only be used for membrane devices that comprise carrier and intermediate layers made of an appropriately temperature-resistant material. Alternatively, chemical reduction (right side) using a liquid or gaseous reducing agent is an obvious choice for materials that are not as temperature-resistant.

Exemplary Embodiment 1:

Production of a graded membrane comprising a flat or tubular macroporous carrier made of $\alpha$-$Al_2O_3$, a mesoporous intermediate layer made of zirconia stabilized with 8 mol % yttria (8YSZ) and a microporous graphite oxide cover layer.

The flat carriers are composed of a monolayer and have pore sizes around approximately 80 nm (ascertained by way of mercury porosimetry). The tubular carriers are designed as graded layers. The $\alpha$-$Al_2O_3$ layers, which thereafter are coated with a mesoporous layer and a microporous layer, have a similar pore size in the range of approximately 70 nm.

The production of the flat carriers included the following steps:

1) tape casting an $\alpha$-$Al_2O_3$ powder suspension (Sumitomo AKP-30 powder) under vacuum, in tapes having a layer thickness of approximately 3 mm and the desired size;

2) sintering the green sheets at temperatures around 1100° C.;

3) grinding; and 4) polishing one side of the tape with a diamond paste (Struers, DP paste 6 µm and 3 µm).

The final layer thickness of the porous carrier thus produced is approximately 2 mm. Commercially available tubular, porous $\alpha$-$Al_2O_3$ membranes (Inopor®), having a pore size in a range suitable for ultrafiltration, are used as the tubular carriers. These carriers were graded, which is to say the porous tubular carrier material was coated on the inside with three additional layers of $\alpha$-$Al_2O_3$.

The uppermost $\alpha$-$Al_2O_3$ layer has a pore size around 70 nm. All carriers included glass seals at the ends. The cover layer was applied onto 105 mm and 250 mm long carriers having an outside diameter of 10 mm and an inside diameter of 7 mm.

A graded mesoporous layer was applied by way of dip coating, wherein two different kinds of 8YSZ-containing liquids were used. The first liquid includes an aqueous dispersion comprising particles having a particle size around 60 nm (ascertained by way of dynamic light scattering). The second liquid includes a sol having a particle size of between 30 and 40 nm. Polyvinyl alcohol (PVA, 60,000 g/mol) was added to prevent extensive penetration of the 8YSZ particles during the coating step.

All coating steps were carried out in a clean room. So as to protect the liquids from the influence of dust, these were cleaned prior to use with 0.8 µm syringe filters (Whatman FP 30/0 8CA).

So as to generate the coating liquid of the first mesoporous layer, 4 g of a commercially available 8% $Y_2O_3$-doped $ZrO_2$ (8YSZ) nano powder (Sigma Aldrich catalog no. 572349) was dispersed in 100 ml of a 0.05 M (mol/L) solution of $HNO_3$ in water with the aid of ultrasound. After 15 minutes of ultrasonic treatment, the dispersion was transferred into small centrifuge tubes and centrifuged at 6500 rpm for 4 minutes. This results in two phases comprising a solid sediment of the larger particles and a supernatant liquid, which contains the desired nanoparticles for coating the mesoporous layer. The supernatant is removed using a pipette.

In a second step, a solution was prepared from polyvinyl alcohol (PVA) in aqueous $HNO_3$ (0.05 M). For this purpose, 3 g PVA was added to 100 ml $HNO_3$ solution, and the mixture was subsequently heated at 98° C. under reflux overnight (approximately 16 hours).

The coating liquid for the first mesoporous intermediate layer is then generated by mixing the supernatant with the PVA solution at a ratio of 3 to 2.

The flat carriers were coated with the liquid comprising the 8YSZ particles using spin coating on the one hand, and dip coating on the other. The tubular carriers were coated on the inside using special devices. These comprise a holder for the carrier to be coated and a mount for a bottle containing the coating liquid, which are connected to one another via a flexible line. While the carrier is fixed, the coating liquid is transferred into the carrier by raising the bottle containing the liquid. For example, the liquid level was thus raised at a speed of 10 mm/s until the carrier was completely filled. After 30 seconds, the liquid level was lowered again at a speed of 10 mm/s. The carrier thus coated was air dried for approximately 1 hour and then thermally treated. In a conventional oven, the layers were calcined under air at 500° C. for 2 hours. The heating and cooling steps took place at 1° C./min. In a typical synthesis pathway, the aforementioned steps involving coating, drying and heating were each carried out twice. With the aid of scanning electron microscope (SEM) analyses, the layer thickness of the produced mesoporous layer was determined to be 1 to 2 µm.

The pore size of this mesoporous 8YSZ layer was ascertained with the aid of permporosimetry. Permporosimetry is an established method for characterizing mesoporous layers. This measures the permeance of a gas, for example of $N_2$, which is conducted through the porous layer. If the gas is moistened with a condensable liquid, such as water, the pores of the layer become increasingly blocked as the moisture content rises as a result of capillary condensation of the liquid inside the pores.

Figure 4:
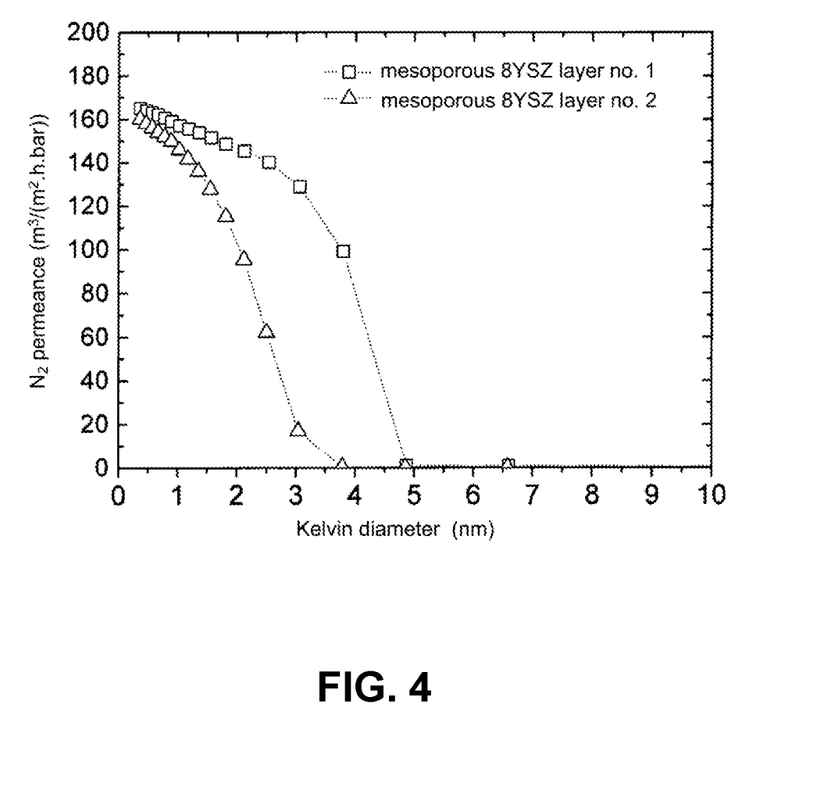
FIG. 4 shows test results of permporosimetry measurements on a membrane device according to the invention, comprising two different mesoporous intermediate layers.

Based on the Kelvin equation, it is possible to determine the so-called Kelvin radius (and the Kelvin diameter). FIG. 4 shows the curve of the $N_2$ permeance of the mesoporous 8YSZ layer as a function of the Kelvin diameter. The measurements were carried out at room temperature using water as the condensable liquid. The membrane is located on the inner side of a 250 mm long tubular α-$Al_2O_3$ carrier structure. The measurement points are plotted as squares.

The Kelvin diameter, which corresponds to 50% of the original permeance, can be defined as the average pore diameter. The 8YSZ layer thus has an average pore diameter ($d_{50}$) of approximately 4 to 4.5 nm. No pores were found that had a diameter of more than 7 nm. Moreover, a very narrow pore size distribution is apparent since more than 95% of pores have a diameter of smaller than 5 nm.

The second mesoporous 8YSZ layer having a smaller pore size was applied with the aid of an aqueous sol. In a typical method step, 50 ml 2-propanol (Merck, SeccoSolv®, catalog no. 100994) was added to 11.6 g of a 70 wt. % zirconium(IV) propoxide solution (Sigma-Aldrich, catalog no. 333972) in an Erlenmeyer flask. The mixture was stirred for 15 minutes and then mixed with 125 ml of a 1 M aqueous $HNO_3$ solution while stirring. During heating, the mixture initially transforms into a clear solution, and then into a sol. The particle size of the sol depends on the heating time. A coating liquid that is suitable for the second mesoporous layer is obtained after approximately 18 hours.

The finished sol is mixed with 1.52 g $Y(NO_3)_3$—$6H_2O$ (Sigma Aldrich, catalog no. 237957) in 175 ml of an aqueous 0.05 M $HNO_3$ solution while stirring, so as to obtain zirconia stabilized with 8 mol % yttria (8YSZ).

In a second step, a solution was prepared from polyvinyl alcohol (PVA) in aqueous $HNO_3$ (0.05 M). For this purpose, 3 g PVA was added to 100 ml $HNO_3$ solution, and the mixture was subsequently heated at 98° C. under reflux overnight (approximately 16 hours).

The coating liquid for the second mesoporous intermediate layer is then created by mixing 5 ml of the sol with 20 ml of an aqueous 0.05 M $HNO_3$ solution and 20 ml of the PVA solution.

The aforementioned first mesoporous 8YSZ layer having an average pore diameter of 4 to 4.5 nm was subsequently treated with the second coating liquid. The same device that was also used to carry out the first coating was used. The coated carriers were likewise initially air dried for 1 hour and subsequently calcined as previously described. With the aid of SEM analyses, the layer thickness of the produced second mesoporous layer was determined to be 200 to 400 µm.

FIG. 4 also shows the curve of the $N_2$ permeance of the second mesoporous 8YSZ layer on the inner side of a 250 mm long tubular α-$Al_2O_3$ carrier structure, ascertained by way of permporosimetry. The measurement points are identified as triangles. The second 8YSZ layer thus has an average pore diameter ($d_{50}$) of approximately 2 to 2.5 nm. No pores were found that had a pore diameter of more than 5 nm. Moreover, again a very narrow pore size distribution is apparent since more than 95% of pores have a size of smaller than 3.5 nm.

The hydrothermal stability of the graded mesoporous 8YSZ layer was examined. The coated carriers were aged at 300° C. in a water vapor atmosphere at 30 bar in an autoclave for one week. No cracks or enlarged pores whatsoever were found subsequent to that. The curves of the permporosimetry measurements showed no significant difference over the coated carriers prior to aging.

A comparison of the SEM analyses based on fresh and aged samples confirmed that the layers were not influenced by the aging at high temperatures.

So as to examine thermal stability, the coated carriers were heated at 600° C., 700° C. and 800° C., each for 2 hours. The curves of the permporosimetry measurements here likewise did not show any significant difference over the coated carriers that were calcined at 500° C. for 2 hours.

Subsequently, the cover layer comprising graphite oxide was applied to the thus created 2-layer (graded) mesoporous 8YSZ intermediate layer. Using known methods, such as the Hummer method, it is possible to use graphite to produce the required graphene oxide dispersion comprising monolayer graphene oxide. Alternatively, commercially available monolayer graphene oxide particles may be used. For example, a diluted monolayer graphene oxide particle dispersion can be created from one part of a commercially available monolayer graphene oxide particle dispersion having a concentration of 4 mg/L (Sigma Aldrich, catalog no. 777676) and 20 parts of demineralized water. Thereafter, this dispersion was purified using a 5 μm syringe filter (Whatman FP 30/5.0 CN). The average particle size of the graphene oxide particles was approximately 500 nm to 1 μm, measured by way of dynamic laser light scattering.

With the aid of this coating dispersion, it was possible to apply a homogeneous and defect-free graphite oxide cover layer onto the graded mesoporous 8YSZ intermediate layer. On planar substrates, the coating dispersion was applied by way of spin coating or by way of dip coating. The same device that was already used to apply the mesoporous intermediate layers onto the carrier was used to coat the inside surfaces of tubular carriers, including the mesoporous 8YSZ intermediate layers.

The liquid level of the diluted monolayer graphene oxide particle dispersion was raised at a speed of 10 mm/s until the carrier was completely filled with the mesoporous intermediate layer. After 30 seconds, the liquid level was lowered again at a speed of 10 mm/s. The carrier thus coated, comprising the intermediate layer, was air dried for approximately 1 hour and then thermally treated. In a conventional oven, the coated carriers were heated under air at approximately 300° C. for 1 hour. The heating and cooling steps took place at 1° C./min. In a typical synthesis pathway, the aforementioned steps involving coating, drying and heating were each carried out twice. With the aid of SEM analyses, the layer thickness of the cover layer thus produced was determined to be 10 to 20 μm.

The graded membrane thus produced, including a cover layer comprising predominantly graphite oxide, is very hydrophilic and exhibits very high permeability for water vapor. Pervaporation analyses were conducted to determine the selectivity of the membrane for water as compared to a second, larger molecule. For this purpose, isopropanol (IPA), which is frequently used in pervaporation analyses, was used as a further larger test molecule. The examinations were carried out on tubular membranes having a length of 250 mm. The test solution comprised 95 wt. % IPA and 5 wt. % water. The analyses were carried out at 70° C. The membrane exhibited very high water permeability, while the diffusion for the larger IPA molecule was blocked. The result, in the form of the separation factor of the gas flux, is considerably better than for previously known membranes. In a representative examination, separation factors of more than 800 were measured, in combination with a flux of 5 kg/m²h, at a temperature of 70° C. In a dehydration test, likewise at 70° C., complete dehydration of the IPA solution containing 5 wt. % water was achieved after 3 hours.

Exemplary Embodiment 2:

First, a graded membrane comprising a graphite oxide cover layer according to Exemplary Embodiment 1 was produced. This was subjected to thermal treatment in a conventional oven under air at 300° C. for 1 hour. Subsequently, the membrane was exposed to a further thermal treatment at 750° C. in a mixture of 3% $H_2$ and 97% Ar, which resulted in reduction of the cover layer into a graphite layer. This reduction took place in an oven specifically adapted for this treatment, in which a vacuum of approximately $10^{-4}$ mbar (0.01 Pa) was initially applied, and thereafter the mixture of $H_2$ and Ar was added.

After reduction, the extremely thin graphite cover layer exhibited no cracks or other defects, neither macroscopically nor under the scanning electron microscope (SEM).

Figure 5:
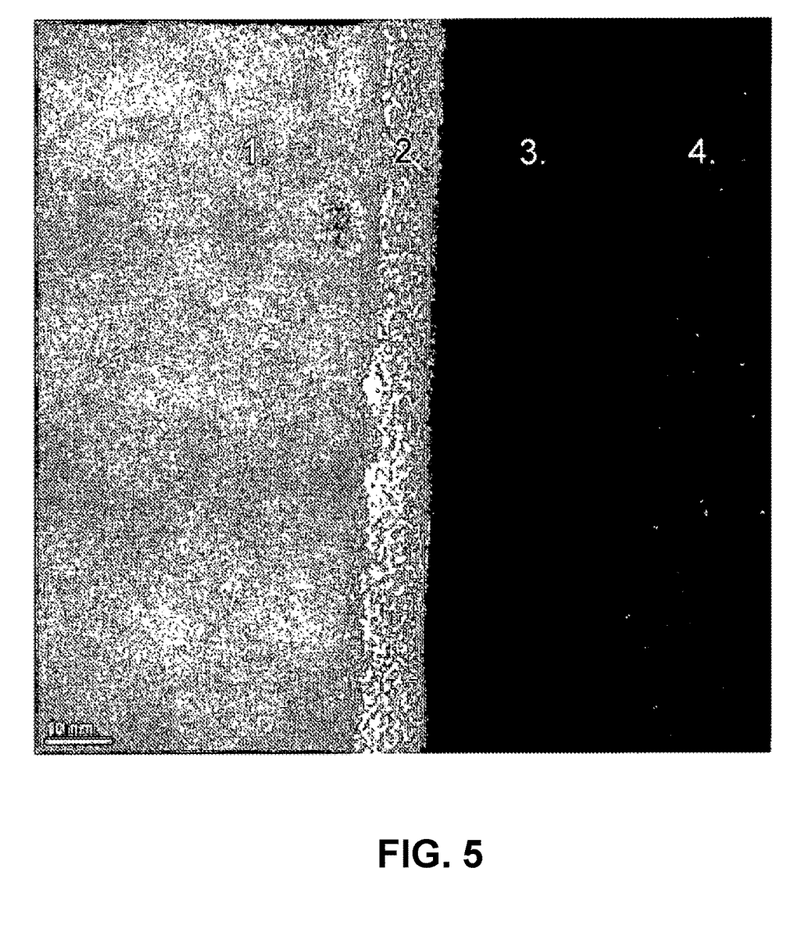
FIG. 5 shows a high resolution TEM image of the graphite cover layer.

The thickness of the cover layer and the number of stacked graphene layers were analyzed by way of transmission electron microscopy (TEM). FIG. 5 shows a high resolution TEM image. In the TEM image, an approximately 10 nm thick graphite cover layer (2) is apparent on the uppermost 8YSZ intermediate layer (1). In addition to the membrane layers, a gold coating (3) and a platinum coating (4) are apparent in the image, which were vapor deposited onto the actual membrane sample during the preparation of the samples. The analysis of the high resolution TEM images shows that the cover layer comprises approximately 20 graphene layers stacked on top of one another.

Thereafter, the distances between the individual graphene layers were analyzed by way of transmission electron diffraction (TED). The analyses showed a distance between layers in the range of 0.3 nm to 0.4 nm. These values vary around 0.35 nm, which corresponds to the distance between the individual graphene layers in graphite (0.335 nm).

In several select flux analyses, the selectivity of these membranes according to the first and second exemplary embodiments for smaller gases was examined. The tests were carried out at temperatures of between 50 and 200° C. using different gases, such as He, $H_2$, $CO_2$ or $N_2$.

Figure 6:
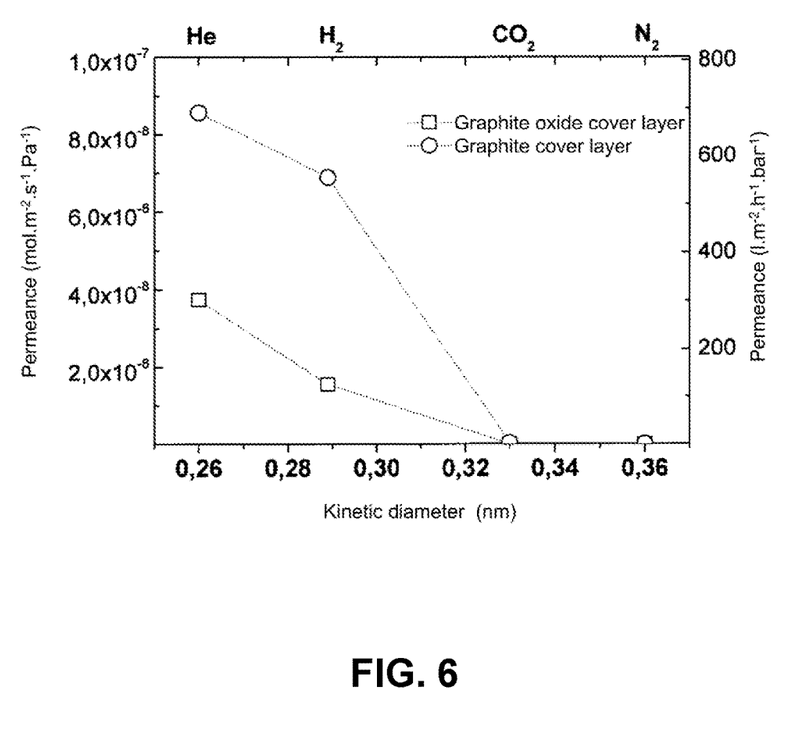
FIG. 6 shows test results of flux analyses for He, $H_2$, $CO_2$ and $N_2$ on a membrane device according to the invention, based on two different cover layers.

FIG. 6 shows the permeance for several gases at 200° C. (473 K) and a pressure of 4 bar ($4*10^5$ Pa) for the two membranes (graphite oxide and graphite cover layer). Good values for He and $H_2$ permeance are yielded for the two membranes, while $CO_2$ and $N_2$ permeate very little or not at all. The two cover layers, both the graphite oxide cover layer and the graphite-based cover layer, thus exhibit excellent selectivity for the following gas pairs:

He/$N_2$: selectivity graphite oxide cover layer >100, graphite cover layer >100;

$H_2$/$N_2$: selectivity graphite oxide cover layer >50, graphite cover layer >150;

$H_2$/$CO_2$: selectivity graphite oxide cover layer >50, graphite cover layer >80.

The literature cites 0.26 nm for He, 0.289 nm for $H_2$, 0.33 for $CO_2$ and 0.364 nm for $N_2$ as kinetic diameters for the corresponding gases. Since the membranes are not permeable by $CO_2$, it can be assumed that the layer distances of the individual layers of the graphite oxide and graphite cover layers range between 0.289 and 0.33 nm. These values are comparable to the distances between individual graphene layers (0.335 nm) in graphite. Based on this, it can be concluded that a graphite-like structure is present as the cover layer in the two membranes.

Moreover, it was possible to show that the measured permeance for He and $H_2$ is 2 to 3 times greater for membranes comprising a graphite cover layer. This effect can be explained by the removal of the oxygen-containing groups during the conversion of graphite oxide into graphite, which otherwise impede the transport of the gas molecules. The membranes according to the invention developed here, comprising a macroporous ceramic carrier, a mesoporous 8YSZ-comprising intermediate layer adapted thereto, and a thermally treated cover layer, exhibit considerably improved properties over the previously known graphene oxide membranes. Similarly to the previously known graphene oxide membranes, the membranes introduced here can be used in the lower temperature range below 150° C. However, the graphite oxide membranes according to the invention can moreover also be used at higher temperatures up to 400° C., and the graphite membranes according to the invention even up to 900° C., wherein in particular the high temperature range is more advantageous since the permeance of He and $H_2$ increases exponentially with the rising operating temperature.

Figure 7:
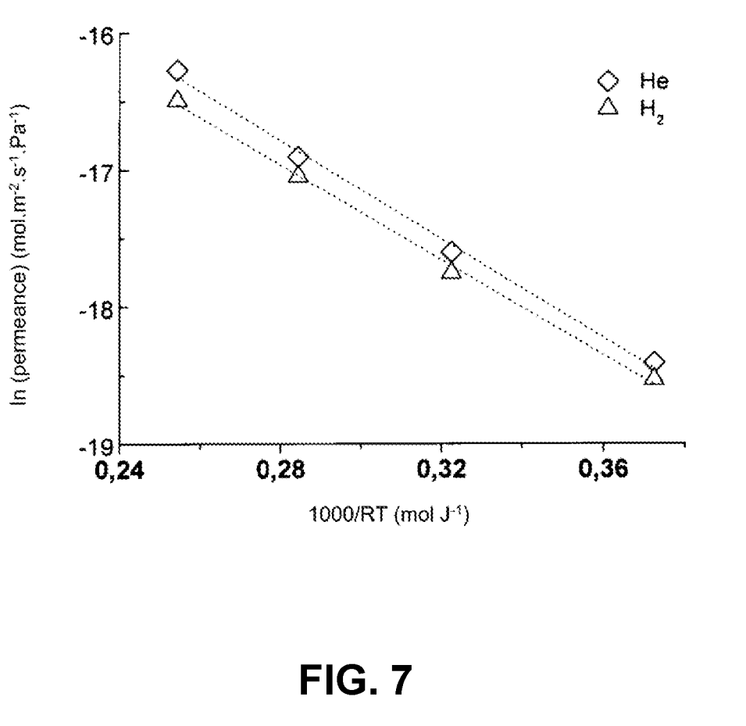
FIG. 7 shows the Arrhenius plot of the flux results for He and $H_2$, for ascertaining the corresponding activation energies.

Exemplary Embodiment 3:

FIG. 7 shows the temperature dependence of the He and $H_2$ permeance of the graphite-based membrane according to Exemplary Embodiment 2. The permeation was measured in the temperature range of between 50 and 200° C. Both He permeance and $H_2$ permeance increase exponentially with the temperature and thus follow the Arrhenius equation. The activation energy $E_{act}$ can be determined from the gradient of the line. The experimentally determined value for $E_{act}$, on average, was 18 kJ mol$^{-1}$ for He and 17.3 kJ mol$^{-1}$ for $H_2$. Both activation energies are considerably above the generally recognized value of 10 kJ mol$^{-1}$ for high-quality membranes and confirm the successful production of high-quality microporous gas separation membranes having a thermally activated transport mechanism.

Exemplary Embodiment 4:

Another alternative production method for a membrane according to the invention starts with a colloidal dispersion of reduced graphene particles. Prior to depositing the cover layer, graphene oxide particles can generally be reduced to graphene particles. Such a reduction can be achieved by way of all previously known methods, such as by way of chemical methods, or by way of microwaves.

Alternatively, the colloidal dispersion comprising reduced graphene particles can also be generated directly from graphene particles. However, since the graphene particles are hydrophobic, such a dispersion will generally be obtained with an organic solvent.

Proceeding from a mesoporous 8YSZ intermediate layer, the coating can be applied by way of dip coating, which was already described elsewhere. As a result, a structure composed of stacked graphene layers is obtained as the cover layer. This cover layer can subsequently be thermally treated at temperatures up to 1000° C. under vacuum, under inert gas or under reducing conditions (such as Ar/$H_2$ mixture).

Exemplary Embodiment 5:

In a further embodiment of the invention, a doped colloidal dispersion made of graphene oxide particles is used as the starting material. Prior to depositing the cover layer, the dispersion is mixed with a doping agent, such as $Ca^{2+}$ or $Mg^{2+}$. The application of the cover layer and thermal treatment are carried out analogously to Exemplary Embodiment 1. As a result, a structure composed of stacked graphene oxide layers comprising doping agents that are predominantly disposed in the interstices between the layers is obtained as the cover layer. If a conventional cross-linking agent is used as the doping agent, the individual layers can be joined in this way. This cover layer can subsequently be reduced, as described in Exemplary Embodiment 2, wherein a structure comprising cross-linked graphene layers is obtained.

Exemplary Embodiment 6:

Due to the large content of sp$^3$ carbon atoms comprising oxygen-containing groups, graphite oxide is known to be a relatively poor electrical conductor. However, it is known that this can be converted into a graphite-like material by removing such oxygen-containing groups from the graphene oxide layers and forming sp$^2$ carbon atoms. Measuring the conductivity of the cover layer subsequent to a thermal treatment is thus a suitable means for proving the formation of a graphite-like material.

A graphite oxide cover layer according to Exemplary Embodiment 1 was therefore applied onto a graded, mesoporous 8YSZ intermediate layer. Analogously to Exemplary Embodiment 2, this was converted into an extremely thin graphite cover layer by way of thermal treatment. In an anhydrous atmosphere (<1 ppm $H_2O$), the conductivity of the cover layer was ascertained at approximately 25° C. so as to exclude a contribution by adsorbed water. Following the thermal treatment under air at 300° C., the cover layer exhibited the behavior of a semiconductor having electrical conductivity of approximately 300 S/m. Following thermal treatment at 750° C. in a mixture of 3% $H_2$ and 97% Ar, the cover layer exhibited electrical conductivity of approximately 15000 S/m. Such a figure is comparable to solid graphite material and thus points to the formation of a graphitic cover layer.

In summary, the membranes according to the invention exhibit, in particular, the following advantages:

a) The membrane device is thermally stable at temperatures between 25 and 800° C.

b) The membrane device is suitable for separating He and $H_2$ from other larger molecules in the manner of a molecular sieve.

c) The gas permeability of the membrane device can be altered by varying the thermal treatment during production.

d) The hydrophilic/hydrophobic properties of the membrane device can be altered by varying the thermal treatment during production.

e) The hydrophilic membrane device is suitable for separating $H_2O$ from other solvents.

f) In the membrane device, the distance between the individual graphene oxide layers of the cover layer can be altered by varying the moisture level.

g) In the membrane device, the distance between the individual graphene oxide layers of the cover layer can additionally or alternatively be altered by using a cross-linking agent as a doping agent.

h) The membrane device comprises a microporous cover layer, which after heat treatment at 750° C. in Ar/3% $H_2$, is sufficiently electrically conductive and, in particular, has electrical conductivity of at least 15000 S/m.

i) The membrane device according to the invention is advantageously able to separate small gas molecules such as He, $H_2$, $CO_2$, $N_2$ or water from among one another and/or from other larger molecules in solid, liquid or gaseous form.

The invention claimed is:

1. A method for producing a membrane device, wherein at least one mesoporous intermediate layer is applied onto a macroporous, ceramic carrier layer, and a microporous cover layer comprising graphite oxide or few-layer graphene oxide or graphite is in turn applied thereon, the microporous cover layer being applied by way of a colloidal dispersion using dip coating and subsequently being dried at temperatures of up to 200° C.

2. The method according to claim 1, wherein a colloidal dispersion comprising graphene oxide particles having particle sizes of between 10 nm and 5 µm is used.

3. The method according to claim 1, wherein a diluted colloidal dispersion having a solids content of graphene oxide particles of between 20 mg and 2 g per liter of colloidal dispersion is used.

4. A method according to claim 1, wherein at least one mesoporous intermediate layer comprising yttria-stabilized zirconia is applied onto the macroporous, ceramic carrier layer.

5. A method according to claim 1, wherein thermal treatment at temperatures of between 200 and 1000° C. takes place after the drying step.

6. A method according to claim 1, wherein a microporous cover layer comprising 5 to 1000 layers of graphene oxide is produced.

7. A method according to claim 1, wherein a microporous cover layer at least partially comprising graphene is produced.

8. A method according to claim 1, wherein said step of said microporous cover layer being applied by way of said colloidal dispersion using dip coating and subsequently being dried at temperatures of up to 200° C. takes place under a reducing atmosphere or under inert gas or under vacuum, the graphene oxide of the cover layer being at least partially reduced to graphene.

9. A method according to claim 1, wherein, after said step of said microporous cover layer being applied by way of said colloidal dispersion using dip coating and subsequently being dried at temperatures of up to 200° C., chemical reduction of the cover layer takes place at temperatures up to 200° C., the graphene oxide of the cover layer being at least partially reduced to graphene.

10. A multilayer membrane device, producible according to claim 1, comprising:
at least one macroporous, ceramic carrier layer including pores having a pore diameter of >50 nm;
at least one mesoporous intermediate layer disposed thereon, including pores having an average pore diameter of 2 nm to 50 nm; and
at least one microporous cover layer disposed on the mesoporous intermediate layer, including pores having an average pore diameter of <0.5 nm,
wherein the microporous cover layer comprises graphite oxide, partially reduced graphite oxide or graphite, and the membrane has molecular sieve properties.

11. The membrane device according to claim 10, comprising at least two mesoporous intermediate layers, in which the particle size, roughness and pore size decrease in the direction of the cover layer.

12. The membrane device according to claim 10, wherein said at least one mesoporous intermediate layer comprises a first and a second mesoporous intermediate layer, of which the first mesoporous intermediate layer is in contact with the macroporous carrier layer, and the second mesoporous intermediate layer is in contact with the microporous cover layer, at least one intermediate layer of the first and second mesoporous intermediate layer including pores having an average pore diameter of less than 5 nm.

13. The membrane device according to claim 12, including a macroporous carrier layer comprising $Al_2O_3$, $TiO_2$, $ZrO_2$, YSZ, $SiO_2$, $CeO_2$, MgO, $Y_2O_3$, $Gd_2O_3$, mullite, cordierite, zeolite, $BaTiO_3$, metallic components, carbon, SiC, $Si_3N_4$, SiOC, SiCN, AlN or a mixture of the aforementioned materials.

14. A membrane device according to claim 10, comprising at least one ceramic mesoporous intermediate layer.

15. The membrane device according to claim 14, including a mesoporous intermediate layer comprising $Al_2O_3$, $TiO_2$, $ZrO_2$, YSZ, $SiO_2$, $CeO_2$, MgO, $Y_2O_3$, $Gd_2O_3$, ZnO, $SnO_2$, mullite, cordierite, zeolite, metal organic framework (MOF) materials, clay, $BaTiO_3$, carbon, SiC, $Si_3N_4$, AlN, SiOC, SiCN, or mixtures of the aforementioned materials.

16. A membrane device according to claim 10, wherein the first mesoporous intermediate layer has a layer thickness of between 1 µm and 20 µm.

17. A membrane device according to claim 10, wherein said at least one mesoporous intermediate layer comprises a first and a second mesoporous intermediate layer, and wherein the second mesoporous intermediate layer has a layer thickness of between 0.1 µm and 2 µm.

18. A membrane device according to claim 10, wherein the microporous cover layer has a layer thickness of between 3 nm and 2 µm, and advantageously between 5 nm and 300 nm.

19. A membrane device according to claim 10, wherein the microporous cover layer comprises between 5 and 1000 layers of graphene oxide.

20. A membrane device according to claim 10, wherein the cover layer at least partially comprises graphene.

21. The membrane device according to claim 19, wherein the microporous cover layer comprises between 5 and 1000 layers of graphene oxide or graphene.

22. A membrane device according to claim 10, wherein the microporous cover layer has electrical conductivity of at least 15000 S/m after a heat treatment at 750° C. in Ar/3% $H_2$.

* * * * *